United States Patent
Pizano et al.

[11] Patent Number: 6,105,055
[45] Date of Patent: Aug. 15, 2000

[54] METHOD AND APPARATUS FOR ASYNCHRONOUS MULTIMEDIA COLLABORATION

[75] Inventors: Arturo Pizano, Belle Mead; Wei-Kwan V. Su, Princeton; Michelle Yan, Plainsboro; Lai Pham, Princeton, all of N.J.

[73] Assignee: Siemens Corporate Research, Inc., Princeton, N.J.

[21] Appl. No.: 09/042,411

[22] Filed: Mar. 13, 1998

[51] Int. Cl.[7] .............................. G06F 13/38; G06F 15/17
[52] U.S. Cl. .................... 709/204; 709/201; 709/203; 709/205; 709/208; 709/209; 709/217; 709/227; 709/300; 709/301; 710/110; 711/1; 340/825.01; 340/825.04; 345/1; 345/330; 345/331
[58] Field of Search .................................. 709/204, 203, 709/207, 205, 208, 209, 217, 227, 300, 304; 710/110; 711/1; 340/825.01, 825.04; 345/330, 331, 1

[56] References Cited

U.S. PATENT DOCUMENTS

| | | | |
|---|---|---|---|
| 5,325,310 | 6/1994 | Johnson et al. | 364/514 |
| 5,689,641 | 11/1997 | Ludwig et al. | 395/200.02 |
| 5,694,544 | 12/1997 | Tanigawa et al. | 395/200.04 |
| 5,727,950 | 3/1998 | Cook et al. | 434/350 |
| 5,745,688 | 4/1998 | Oka | 709/204 |
| 5,802,518 | 8/1998 | Karaev et al. | 707/9 |
| 5,819,038 | 10/1998 | Carleton et al. | 709/204 |
| 5,822,518 | 10/1998 | Ooki et al. | 395/187.01 |
| 5,822,525 | 10/1998 | Tafoya et al. | 709/204 |
| 5,838,313 | 11/1998 | Hou et al. | 345/302 |
| 5,844,969 | 12/1998 | Goldman et al. | 379/93.24 |
| 5,881,233 | 3/1999 | Toyoda et al. | 709/218 |
| 5,898,836 | 4/1999 | Freivald et al. | 709/218 |
| 5,903,723 | 5/1999 | Beck et al. | 395/200.3 |
| 5,915,001 | 7/1999 | Uppaluru | 379/88.22 |
| 5,923,848 | 7/1999 | Goodhand et al. | 709/219 |
| 5,951,636 | 8/1999 | Zerber | 709/202 |
| 5,956,483 | 9/1999 | Grate et al. | 709/203 |
| 5,974,446 | 10/1999 | Sonnenreich et al. | 709/204 |
| 5,976,835 | 11/1999 | Ludwig et al. | 709/204 |
| 5,983,263 | 11/1999 | Rothrock | 709/204 |

*Primary Examiner*—Frank J. Asta
*Assistant Examiner*—Bunjob Jaroenchonwanit
*Attorney, Agent, or Firm*—Donald B. Paschburg

[57] ABSTRACT

A multimedia collaboration system combines unique multimedia communications and media processing mechanisms with off-the-shelf components that support information sharing and distribution. More specifically, the system provides an asynchronous multimedia collaboration whiteboard that enables the creation of messages containing synchronized voice, graphics and mouse gestures to describe conditions associated with an underlying multimedia object. On the server side, the system includes a delayed conference manager connected to a conference database, an email server, a newsgroup server and a web server. On the client side, the system includes a dynamic annotation editor which enables the use of synchronized voice, graphics and mouse gestures in the discussion. The client side also includes a newsgroup and email reader and a web browser.

19 Claims, 7 Drawing Sheets

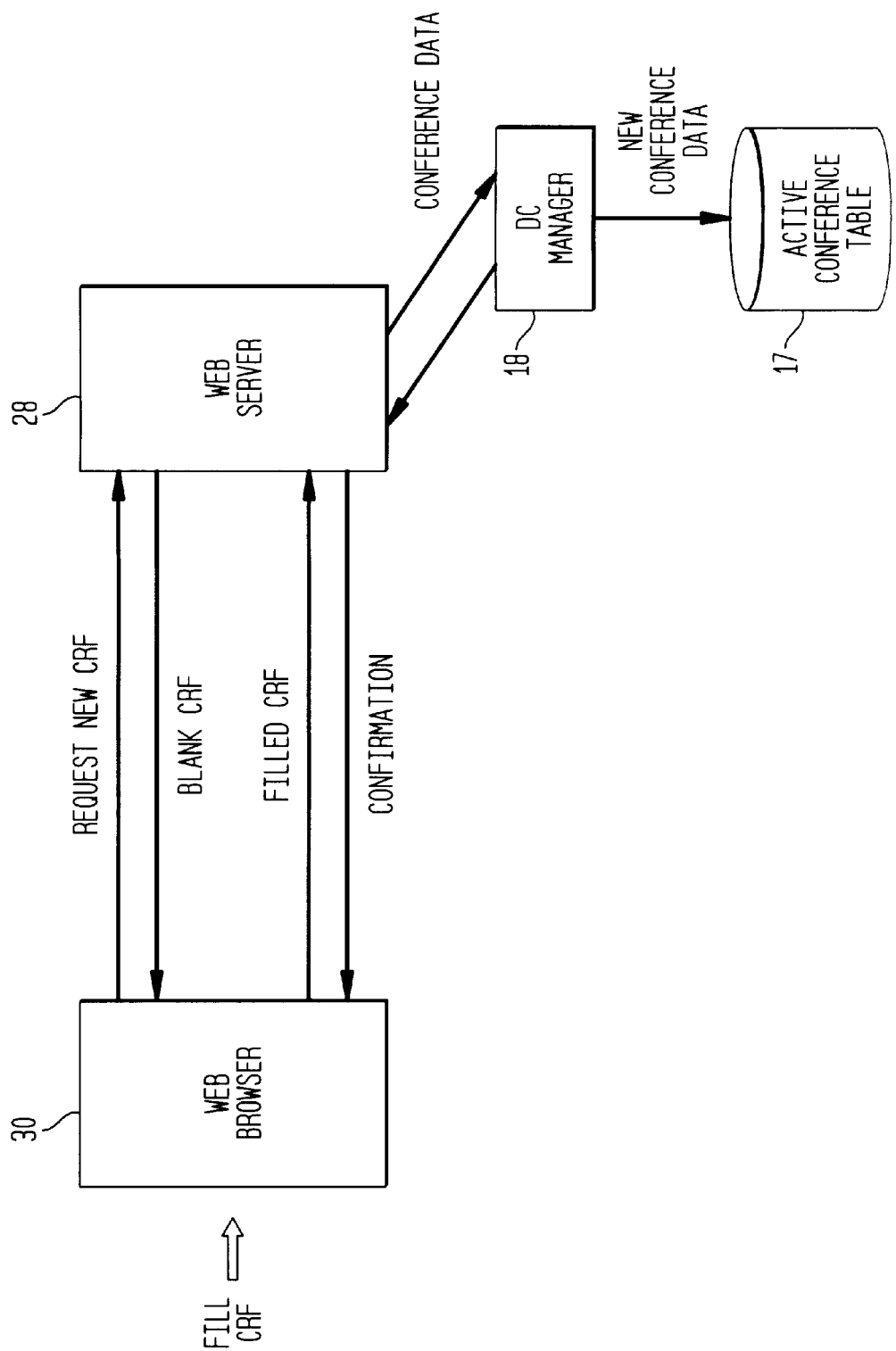

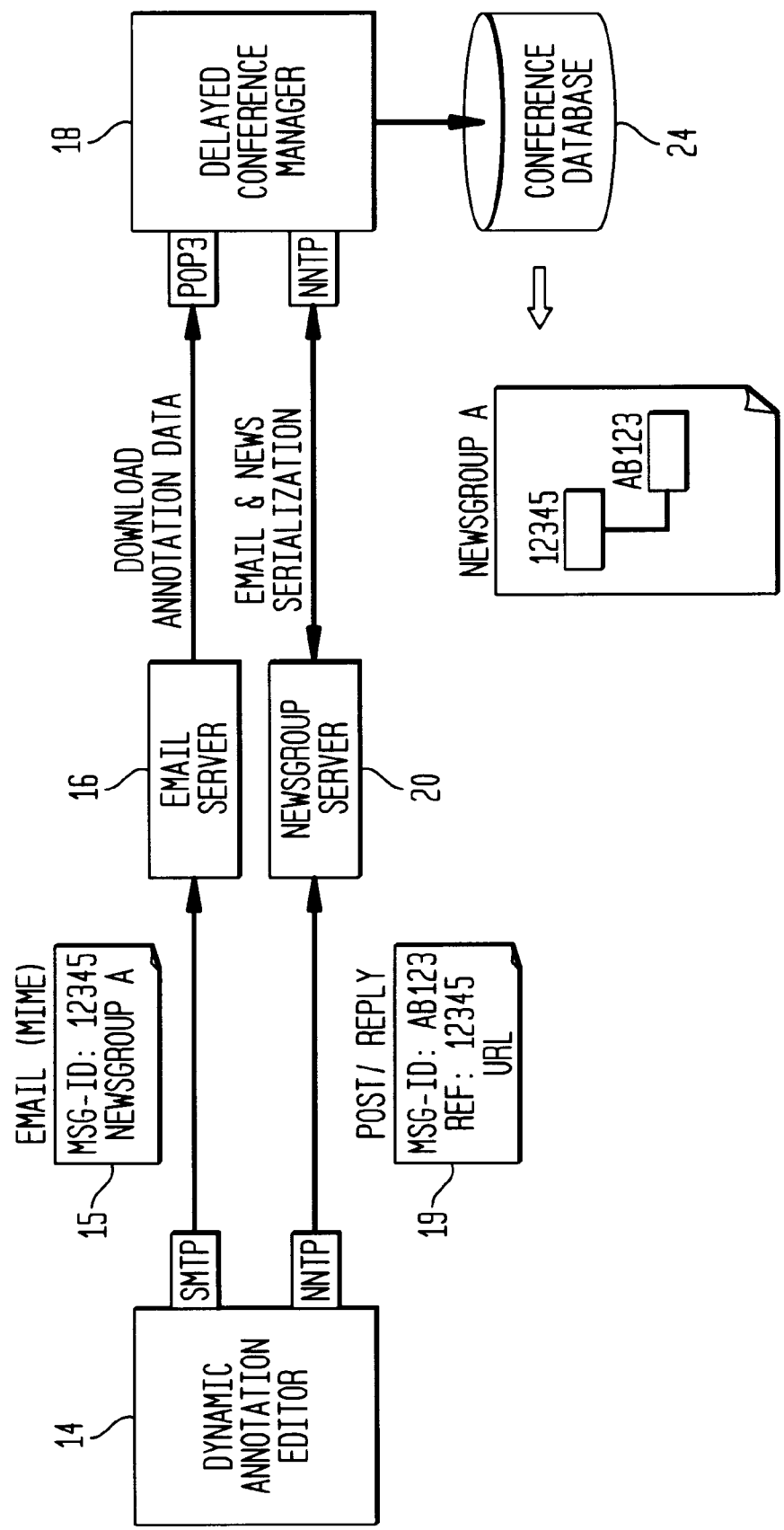

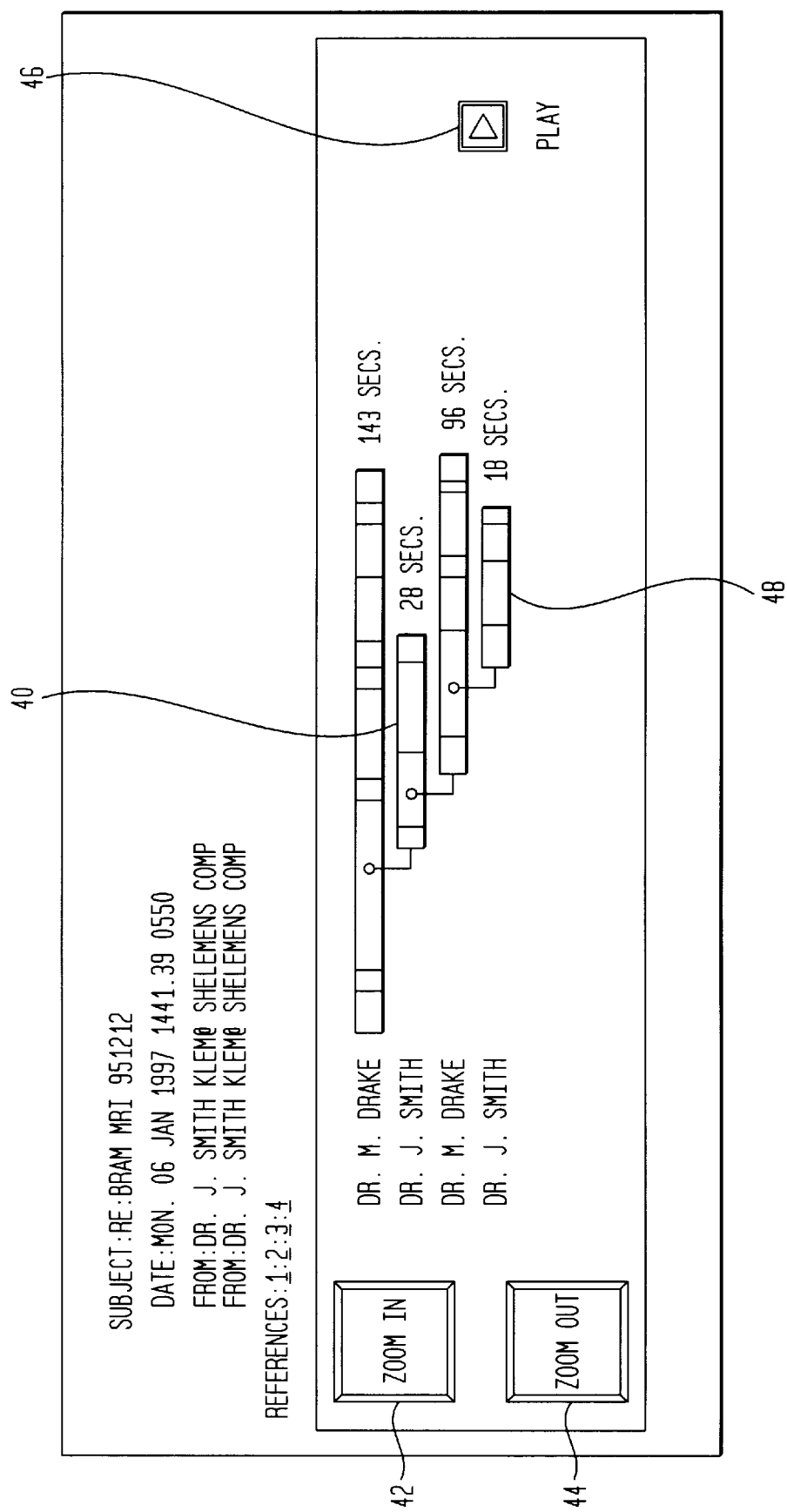

FIG. 7A
BEGIN
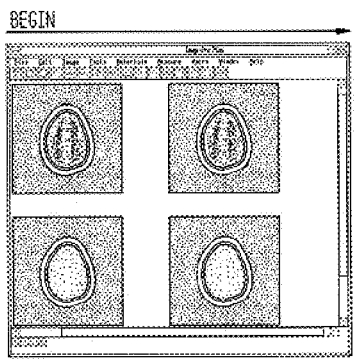
FIG. 7B
STOP (ANNOTATION POINT)
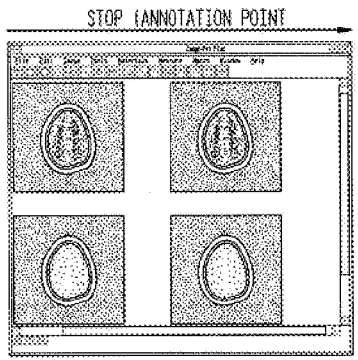
STOP THE PLAYBACK AND
EDIT THE STATIC IMAGE
FIG. 7D
FIG. 7C
END
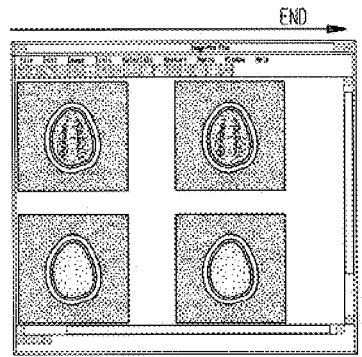
FIG. 7D
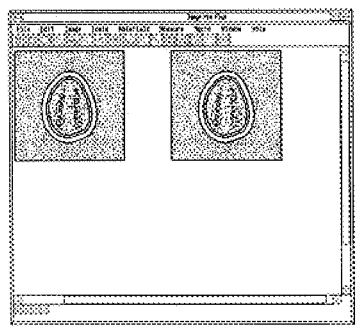
RECORD
REPLY
FIG. 7E
RECORD
REPLY
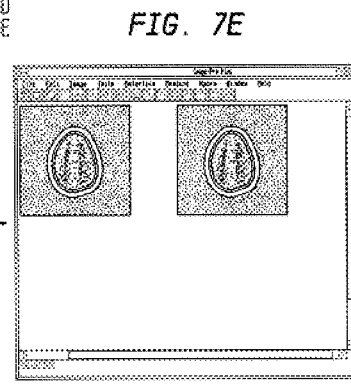

METHOD AND APPARATUS FOR ASYNCHRONOUS MULTIMEDIA COLLABORATION

BACKGROUND OF THE INVENTION

1. Field of the Invention

The present invention relates to multimedia communications and more particularly to asynchronous multimedia collaboration to create messages containing synchronized voice, graphics and mouse gestures.

2. Description of the Prior Art

The ever increasing availability and use of computers in everyday life has created opportunities for the development of systems that enable two or more people to engage in what is termed computer supported collaborative work. In general, the prior art in this area can be divided into two categories: synchronous collaboration tools which enable a group of people to engage in discussions and information sharing while all of them are connected to a computer network; and asynchronous collaboration tools which enable a group of people to share data related to a common activity by means of a centralized data repository or thorough the exchange of electronic messages.

The NetMeeting product, from Microsoft Corporation, represents the state-of-the-art in synchronous collaboration tools. It enables video conferencing, application sharing and whiteboard applications over standard communications networks. Lotus Notes from Lotus Development Corporation, and the Microsoft Exchange Server, from Microsoft Corporation, provide state-of-the-art functionality in asynchronous collaboration, including support for information synchronization, workflow management, data security and replication.

In terms of the communication tool, the asynchronous multimedia collaboration whiteboard used in this invention is an enhancement of the dynamic image annotation mechanism described in U.S. patent application Ser. No. 08/560,566 entitled "A Multimedia Based Reporting System With Recording And Playback Of Dynamic Annotation" filed Nov. 20, 1995, assigned to the same assignee as the present invention and hereby incorporated by reference. In particular, the asynchronous multimedia collaboration whiteboard provides the ability to include video, graphics and other multimedia objects in addition to static images, graphics and text. It also provides the annotation editing and annotation-on-annotation capabilities needed to facilitate the systematic exchange of dynamic annotations.

It is an object of the present invention to provide users with the ability to engage in computer-assisted collaborative tasks, taking full advantage of the expressive power of voice and data communications (conferencing), but without having to be present at the same time (delayed).

SUMMARY OF THE INVENTION

The present invention is a system that combines unique multimedia communications and media processing mechanisms with off-the-shelf components that support information sharing and distribution. More specifically, the present invention provides an asynchronous multimedia collaboration whiteboard that enables the creation of messages containing synchronized voice, graphics and mouse gestures to describe conditions associated with an underlying multimedia object. This whiteboard is tightly integrated into a repository of data for group discussions, which enables centralized management of information shared among a predefined group of people. The integration is achieved by means of a unique delayed conference manager that maintains and manages the information associated with each user's participation.

On the server side, the present invention includes the delayed conference manager connected to a conference database, an email server, a newsgroup server and a web server. On the client side, the present invention includes a dynamic annotation editor which enables the use of synchronized voice, graphics and mouse gestures in the discussion. The client side also includes a newsgroup and email reader and a web browser.

BRIEF DESCRIPTION OF THE DRAWINGS

FIG. 2 illustrates a block diagram of a conference set up.

FIG. 4 illustrates a block diagram of the posting of new contributions.

FIG. 6 illustrates an intermediate conference representation.

FIGS. 7a, 7b, 7c, 7d, and 7e illustrate examples of annotation editing/annotation-on annotation.

DETAILED DESCRIPTION OF THE INVENTION

Figure 1:
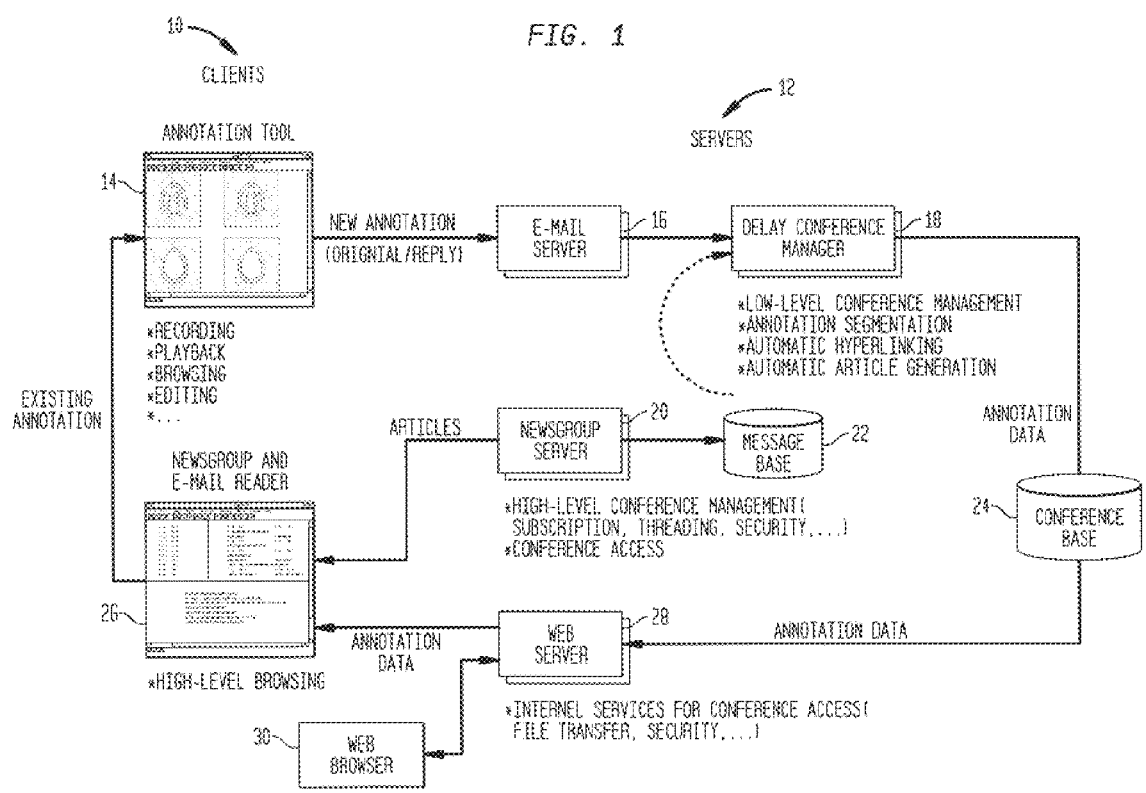
FIG. 1 illustrates a block diagram of the present invention.

FIG. 1 shows a block diagram of the main components of the present invention. On the server side 12, the present invention includes the following components. A delayed conference manager (DC manager) 18 is a key component on the server side. The DC manager 18 supports functions for managing conferences and processes the dynamic media annotation. In the latter case, it receives messages from the client side 10 and separates and stores the dynamic annotation component into a conference base 24 to be accessed on a web server 28. It also updates message base 22 stored in a newsgroup server 20. An email server 16 facilitates communication between the delayed conference manager 18 and the components of the client-side 10, in particular between the dynamic annotation editor 14 and the delayed conference manager 18. The newsgroup server 20 provides the basic repository for the underlying messages of the message base 22. This data is organized in the form of messages containing the underlying information of each user's contribution, including user names, dates, and associations (threads) between the messages. It does not, however, contain the annotation data, which is handled separately by the delayed conference manager 18 as described below. A newsgroup and email reader 26 is a standard component as is known in the art. A web server 28 interacts with a web browser 30 on the client side 10 to download the dynamic annotation component of a user contribution. It uses the standard HTTP protocol for this purpose. The web server 28 is also a standard component as is known in the art.

The following components are included in the present invention on the client side 10. The dynamic annotation editor 14 enables the use of synchronized voice, graphics, and mouse gestures in the discussion. The dynamic annotation editor 14 supports recording and playback of the annotations as well as editing and annotation-on-annotation. It interacts through the newsgroup reader 26 with the newsgroup server 20 to which it sends an abbreviated version of the user contribution. The dynamic annotation editor 14 also interacts with the delayed conference manager 18 to which it sends the annotation data via a message handled by the email server 16. The annotation editor 14 could be a stand-alone tool activated by the user from the computer desktop or through the email reader 26. The newsgroup and email reader 26 provides the initial access to the conference message base 22. The newsgroup reader 26 interacts with the newsgroup server 20 to render the header information associated with each user participation, and if appropriate, additional data such as text, images and graphics, but not the annotation. The newsgroup reader 26 is a standard component that is known in the art. Notice that state-of-the-art newsgroup readers are also email readers, e.g., the Microsoft Exchange Client or the Netscape Newsgroup reader. The web browser 30 is an extension to the newsgroup reader 26 used to interpret and display a graphical representation of the conference data. This graphical representation enables the presentation of time information that would otherwise not be available to the user in the standard newsgroup reader interface. The web browser 30 provides the mechanism needed to download a dynamic annotation from the web server 28. It plays a passive role, simply activating the dynamic annotation editor when an annotation is downloaded. However, the web browser 30 plays an active role in certain administrative functions of the system.

The information flow of the present invention will now be discussed. FIG. 2 shows a block diagram of a typical conference set-up. The central concept in the system is that of a delayed conference. A delayed conference consists of one or more messages, some of which may contain dynamic annotations. A user requests a new delayed conference on behalf of his collaborators by submitting a termed conference requisition form (CRF) with the name and type of the desired conference. Two conference types exist; public conferences in which anybody can participate, and private conferences where only a predetermined group of users are allowed to participate. In the latter case, the conference requisition form includes the identities of the participants (in the form of email addresses) and, optionally, the type of access each user will have in the conference. Two types of access are available; full, which enables reviewing any of the existing messages as well as adding new ones, and read-only which entitles a user to view the contents of the conference but not to participate.

The flowchart in FIG. 2 shows the flow of information during a typical conference set-up process. Similar interactions occur in subsequent conference status updates. The conference set-up process is initiated when the user, from a web browser 30, requests an empty CRF from a predefined server 28. The server 28 delivers the requested form to the web browser 30. The CRF is then filled out by the user and returned to the web server 28. The server 28 then delivers conferencing data to the delayed conference manager (DC manager) 18. This is performed by using standard interfaces such as server side scripts or a CGI gateway. Upon reception of the CRF, the DC manager 18 creates a new entry in the active conference table 17. This entry contains the name of the new conference, the date, the identification (email address) of the person requesting the conference and, if the conference is private, the names, email addresses and privileges of the participants. By default, the person that submits the initial request becomes the conference administrator. Only that person can change the properties of the conference including adding or deleting participants, changing participant privileges, or closing the conference. The process is completed when the DC manager 18 returns a confirmation to the user via the web server 28 and web browser 30. The above represents one conference set-up process and several variations are possible dependent on the specific needs of the user or the organization.

The posting of new contributions will now be discussed. There are three steps involved in the process of posting new contributions. The first step is annotation generation within the annotation tool (14 of FIG. 1) which includes creating a dynamic annotation (recording). The second step is posting which includes submitting the annotation to an email server (16 of FIG. 1) and posting the title to a newsgroup server (20 of FIG. 1). The third step is server-side processing which includes the downloading and managing of the annotation data by the DC manager (18 of FIG. 1).

Figure 3A:
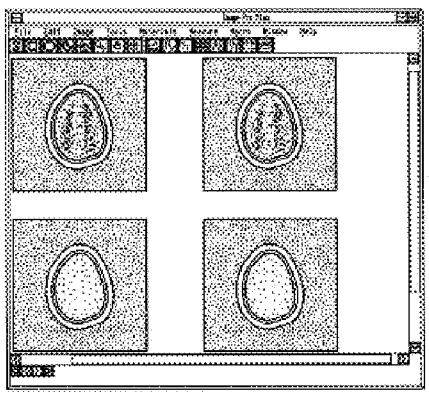
FIGS. 3a, 3b, and 3c illustrate the posting of new contributions.
Figure 3B:
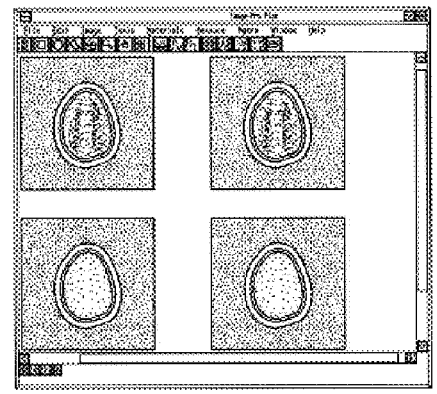
Figure 3C:
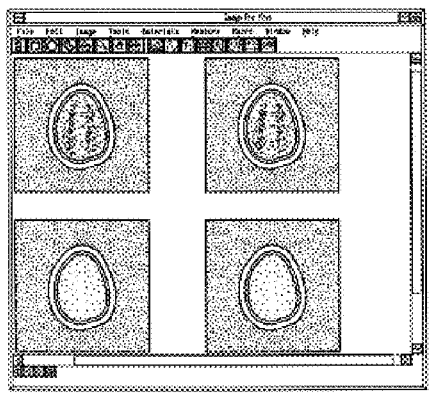

FIG. 3 illustrates the steps involved in the generation of a new dynamic annotation. FIG. 3*a* shows pre-annotation, during which users may add text and/or graphics, and load images. FIG. 3*b* shows annotation recording which involves the recording of the synchronized voice comments and mouse gestures using a volume control and VCR controls, such as record, play, stop, forward, and rewind. FIG. 3*c* shows annotation playback which is an optional step during which users can playback the annotation to check its contents.

FIG. 4 illustrates the operations triggered by the posting of new contributions. Once an annotation is generated, a user clicks the "DC" button of the dynamic annotation editor 14 for distribution and discussion. First a unique message ID 15 is generated and added to the annotation data. Then the annotation is sent to the DC manager 18 through an email server 16 (as an email) using the SMTP protocol. At the same time, the discussion title is posted and the Uniform Resource Locator (URL) points to the location at which the actual annotation will be stored using the NNTP protocol. This is identified on message 19.

The following will describe the server-side processing. A process running in the background in the DC manager 18 periodically monitors whether a new message arrived. The condition for being a new message is that there must be a new email and a new post, at the email server 16 and the newsgroup server 20 respectively, with both carrying exactly the same message ID. If this condition is true, the DC manager 18 will download the email from the email server 16, decode the annotation attachment, and put the attachment into the designated entry/folder at a conference database 24. To serialize the events during downloading, storing and browsing, the DC manager 18 communicates with the newsgroup server 20 through the NNTP protocol, so that the newly arrived post will not be accessible at the delayed conference manager 18 until the downloading and storing process is completely finished.

Figure 5:
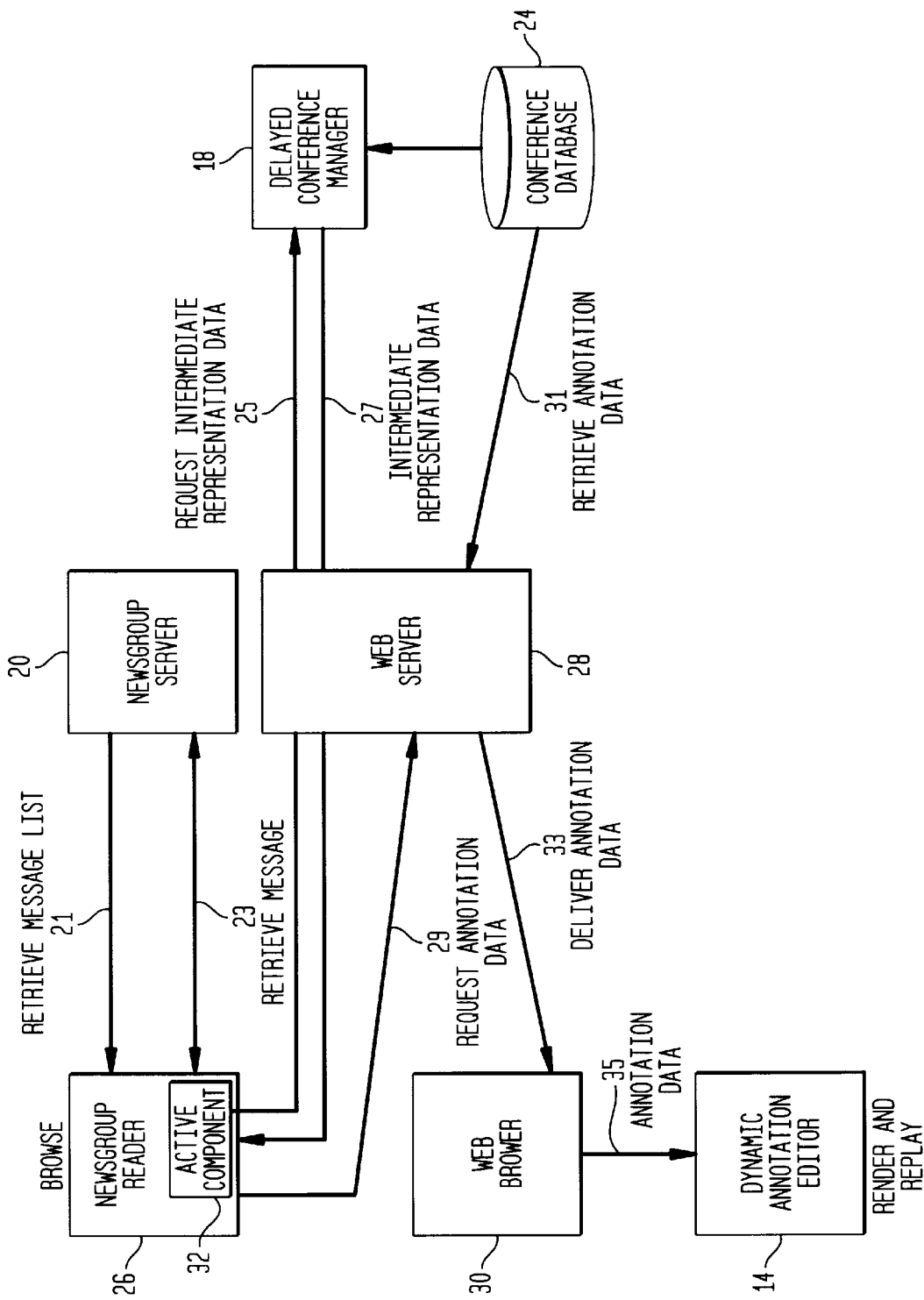
FIG. 5 illustrates a block diagram of accessing existing contributions.

The following will describe accessing existing contributions as illustrated in FIG. 5. There are two steps involved in the process of retrieving new contributions: browsing and selection, and download and review. With browsing and selection, users first connect to the newsgroup server 20, retrieve the headers of previous postings, and select a specific message for review. This is identified by retrieve message list 21. Once the message is identified they issue a request for the newsgroup server 20 to download its contents. This is identified by retrieve message 23. This message contains an intermediate representation of the conference structure in which individual annotations are represented by time lines and linked to each other as shown in FIG. 6. These intermediate representations are generated with an active component 32 running on the newsgroup reader 26 that communicates with the delayed conferencing manager 18 through the web server 28. This is identified by request intermediate representation data 25. During this communication the delayed conferencing manager 18 transfers information regarding the overall structure of the conference. This is identified by intermediate representation data 27. This information is handled by the active component 32 to render the intermediate representations using the algorithm described below. With the intermediate representation running locally in the active component 32, the user can browse the conference database 24 and request to review the annotation associated with a specific message.

With download and review, the request to download the selected annotation is received by the web server 28. This is identified by request annotation data 29. The web server 28 retrieves the corresponding file from the conference database 24 and delivers it to the web browser 30 running on the client side. This is identified by retrieve annotation message 31 and deliver annotation message 33. The web browser 30 in turn passes the data to the dynamic annotation editor 14 which renders it. This is identified by annotation data 35. The user can then review the message and, if necessary, prepare a posting or reply.

The process of posting replies involves three steps. The first step is editing where users may add/delete/move around text or images when reviewing the previous annotation. The second step is adding annotations where users may add annotations on the previous one, preparing for posting a reply. The third step is submitting a reply where users may add necessary information to the annotation reply and go back to the steps where the unique message ID 15 and message 19 are generated in FIG. 4, therefore starting another loop.

The following will describe editing. After a user reviews the previous annotation and would like to make a contribution or reply to the conference, the user may add text or load images or move them around using the dynamic annotation editor, similar to the pre-annotation in the annotation generation.

The dynamic annotation tool also allows a reviewer to add annotations to the previous one. The added annotation is recorded in the same fashion as in the annotation recording in the annotation generation.

For submitting a reply, once the content of reply is prepared and finished, a user may click the "Reply to DC" button to submit the user's reply to the conference. In addition to the events happening during clicking the "DC" button, clicking the "Reply to DC" also inserts the reference ID, which is the message ID that it replies to, into the reply annotation. Message IDs and reference IDs are necessary information for the intermediate representation to summarize the conference structure.

The following will describe intermediate representation generation. The indexing file obtained from the DC manager contains the structure information regarding the lengths of each annotation and how they are linked to each other. Given this information, the following steps are used to generate the intermediate representation shown in FIG. 6. 1) For each annotation, a time line representation (bar) 40 is created which is proportional to the duration of the annotation. Added to the representation could be the name of the participants on the left side of the bar and the numeric value on the right side of the bar. This step could be repeated for annotation in the conference. 2) To link annotations, the algorithm starts with the top-level timeline and identifies all the replies. For each reply, the point in time (with respect to the original time line) where the reply was inserted should be identified. The children's time line should be aligned with this point and a joining line should be drawn. 3) This step should be applied to every timeline recursively until no more replies exist.

Support for the zoom in button 42 and the zoom out button 44 works as follows. Initially, only the top annotation and its children (immediate replies) are shown. When the zoom out button is pressed, the system will display two generations of annotations, i.e., the top annotation, its children and grandchildren (replies-to-replies). Every time the zoom out button is pressed, a new generation is shown. Conversely, when the zoom in button is pressed, one less generation is shown, until only the top annotation is visible.

The play button 46 in FIG. 6 is associated with the active annotation 48 (highlighted in a different color). Pressing this button will instruct the system to download the corresponding annotation and play it using the dynamic annotation tool.

FIG. 7 illustrates examples of annotation editing/annotation-on annotation. FIG. 7a shows the original annotation before playback. FIG. 7b shows the original annotation during playback. FIG. 7c shows the original annotation after playback. FIG. 7d shows the annotation after editing and FIG. 7e shows the annotation after adding the new annotation.

The main advantages of the present invention when compared to systems of the prior art are the following. The present invention gives users the ability to use dynamic media annotation to communicate. The prior art groupware systems give users the ability to communicate through isolated voice and text facilities. The present invention also enables users to participate at their own pace and requires significantly less computing and network resources than the prior art on-line discussion tools.

It is not intended that this invention be limited to the hardware or software arrangement, or operational procedures shown disclosed. This invention includes all of the alterations and variations thereto as encompassed within the scope of the claims as follows.

What is claimed is:

1. A system for asynchronous multimedia collaboration comprising:

a delayed conference manager for providing centralized management of asynchronous conferences, the delayed conference manager comprising means for generating index data representing the structure and correspondence of dynamic annotation data associated with user contributions to a given asynchronous conference;

an email server connected to said delayed conference manager for receiving email messages having the dynamic annotation data of user contributions, wherein the delayed conference manager further comprises means for downloading the email messages from the email server and extracting the dynamic annotation data;

a conference base connected to said delayed conference manager for storing the index data and the extracted dynamic annotation data;

a web server connected to said conference base for accessing the dynamic annotation data;

a message base connected to said delayed conference manager for storing user contribution data associated with the given asynchronous conference; and a newsgroup server connected to said message base for posting titles of user contributions to the given asynchronous conference.

2. A system for asynchronous multimedia collaboration as claimed in claim 1 further comprising:

a dynamic annotation editor connected to said email server;

a newsgroup and email reader connected to said dynamic annotation editor; and a web browser connected to said web server.

3. A system for asynchronous multimedia collaboration as claimed in claim 2 wherein said delayed conference manager comprises:

update means for updating messages stored in said newsgroup server.

4. A system for asynchronous multimedia collaboration as claimed in claim 2 wherein said email server comprises:

communication means for facilitating communication between said dynamic annotation editor and said delayed conference manager.

5. A system for asynchronous multimedia collaboration as claimed in claim 2 wherein said newsgroup server comprises:

a basic repository for messages.

6. A system for asynchronous multimedia collaboration as claimed in claim 2 wherein said web server comprises:

interaction means for interacting with said web browser to download a dynamic annotation component of a user contribution.

7. A system for asynchronous multimedia collaboration as claimed in claim 2 wherein said dynamic annotation editor comprises:

enable means for enabling use of synchronized voice, graphics, and mouse gestures;

support means for supporting recording and playback of annotations, editing and annotation-on-annotation;

first interaction means for interacting through said newsgroup and email reader with said newsgroup server; and second interaction means for interacting with said delayed conference manager.

8. A system for asynchronous multimedia collaboration as claimed in claim 2 wherein said newsgroup and email reader comprises:

provide means for providing initial access to messages of said message base; and interaction means for interacting with said newsgroup server to render header information associated with each user, and additional data such as text, images and graphics.

9. A system for asynchronous multimedia collaboration as claimed in claim 2 wherein said web browser comprises:

an extension to said newsgroup and email reader used to interpret and display a graphical representation of said conference data; and download means for downloading a dynamic annotation from said web server.

10. A system for asynchronous multimedia collaboration as claimed in claim 1, wherein the user contribution data stored in the message base comprises user names, dates of the user contributions and associations between the messages.

11. A method for providing asynchronous multimedia collaboration comprising the steps of:

setting up a delayed conference with a centralized delayed conference manager;

posting a new user contribution, wherein the step of posting comprises the steps of generating a new dynamic annotation, submitting the new dynamic annotation to an e-mail server via an e-mail message, posting a title of the dynamic annotation to a newsgroup server, and processing said dynamic annotation by said delayed conference manager;

accessing existing user contributions; and posting replies.

12. A method for providing asynchronous multimedia collaboration as claimed in claim 11 wherein processing said dynamic annotations comprises the steps of:

downloading annotation data by said delayed conference manager; and managing said annotation data by said delayed conference manager.

13. A method for providing asynchronous multimedia collaboration as claimed in claim 12, wherein the step of posting a new user contribution further comprises the steps of:

generating a unique message identification code;

associating the unique message identification code with the new dynamic annotation and the posted title.

14. A method for providing asynchronous multimedia collaboration as claimed in claim 13, wherein the step of downloading annotation data by said delayed conference manager comprises the steps of:

monitoring, by the delayed conference manager, for the posting of the new user contribution;

determining, by the delayed conference manager, that the new user contribution is posted when an e-mail message at the e-mail server and a title post at the newsgroup server have the same unique identification code; and downloading the e-mail message from the e-mail server and extracting the dynamic annotation from the e-mail message.

15. A method for providing asynchronous multimedia collaboration as claimed in claim 11 wherein accessing existing contributions comprises the steps of:

browsing and selection; and download and review.

16. A method for providing asynchronous multimedia collaboration as claimed in claim 15 wherein browsing and selection comprises the steps of:

connecting to a newsgroup server;

retrieving headers of previous postings;

selecting a specific message to review; and issuing a request for a newsgroup server to download contents.

17. A method for providing asynchronous multimedia collaboration as claimed in claim 16 wherein download and review comprises the steps of:

retrieving by a web server a corresponding file from a conference database;

delivering said corresponding file to a web browser;

passing by said web browser said corresponding file to a dynamic annotation editor; and rendering by said dynamic annotation editor said corresponding file.

18. A method for providing asynchronous multimedia collaboration as claimed in claim 11 wherein posting replies comprises the steps of:

editing a previous annotation;

adding annotations to said previous annotation; and submitting necessary information to an annotation reply.

19. A method for providing asynchronous multimedia collaboration as claimed in claim 11 wherein setting up a conference comprises the steps of:

requesting from a web browser a conference requisition form from a predefined server;

delivering said conference requisition form to said web browser;

returning a completed conference requisition form to said predefined server;

delivering conferencing data from said predefined server to said delayed conference manager;

creating by said delayed conference manager a new entry in an active conference table; and returning from said delayed conference manager a confirmation via said predefined server and said web browser.

* * * * *